US008348161B2

(12) United States Patent  (10) Patent No.: US 8,348,161 B2
Huang  (45) Date of Patent: Jan. 8, 2013

(54) THREE-DIMENSIONAL SPECTACLES AND A MANAGEMENT SYSTEM THEREFORE

(76) Inventor: Vincent Huang, Taipei (TW)

( * ) Notice: Subject to any disclaimer, the term of this patent is extended or adjusted under 35 U.S.C. 154(b) by 40 days.

(21) Appl. No.: 13/006,894

(22) Filed: Jan. 14, 2011

(65) Prior Publication Data

US 2012/0181328 A1    Jul. 19, 2012

(51) Int. Cl.
*G06F 19/00*    (2011.01)
(52) U.S. Cl. ............... 235/385; 235/492; 340/572.1
(58) Field of Classification Search ............ 235/385, 235/492; 340/572.1–572.4
See application file for complete search history.

(56) References Cited

U.S. PATENT DOCUMENTS

| 7,005,988 | B2 * | 2/2006 | Mathewson et al. | 340/572.4 |
| 2009/0140036 | A1 * | 6/2009 | Haddadi | 235/375 |
| 2011/0304462 | A1 * | 12/2011 | Yoo et al. | 340/572.1 |

OTHER PUBLICATIONS

"XpanD X Series (>The Red<)", Sep. 29, 2009, http://matrixeng.com/pdfs/Xpand_the_X_Series.pdf, all pages.*
E. Taub, "A High-Tech Movie Battle: Which 3-D Glasses Are Best?", Dec. 27, 2009, http://www.nytimes.com/2009/12/28/technology/28glasses.html?_r=1, all pages.*

* cited by examiner

*Primary Examiner* — Thien M Le
*Assistant Examiner* — Christopher Stanford
(74) *Attorney, Agent, or Firm* — Rosenberg, Klein & Lee

(57) ABSTRACT

An improved structure of three-dimensional (3D) spectacles is provided, including a spectacle frame on which an RFID (Radio Frequency Identification) chip is mounted. The 3D spectacles are specifically for use in a 3D auditorium or 3D theater and are composed of a frame, lenses, and temples. The RFID chip is combined with the spectacle frame by being embedded in the frame or attached to a surface of the frame. With the RFID chip so mounted, a theater worker may use a reader to identify if a specific pair of 3D spectacles has already been sanitized. Also, the 3D spectacles can help in entrance and exit management, ticketing management, distribution of souvenirs, and toilet guiding service. In file-out, a reader may be used to confirm the returning of 3D spectacles. In this way, the theater service quality can be significantly improved.

1 Claim, 3 Drawing Sheets

THREE-DIMENSIONAL SPECTACLES AND A MANAGEMENT SYSTEM THEREFORE

BACKGROUND OF THE INVENTION

1. Field of the Invention

The present invention relates to a structure of three-dimensional (3D) spectacles, and in particular to 3D spectacles specifically for 3D auditoria or 3D theaters, which belong to the field of application of 3D spectacles and are used in combination with an RFID (Radio Frequency Identification) chip and reader for the purposes of simplifying the management of theater and improving service quality of theater.

2. The Related Arts

Three-dimensional (3D) spectacles are commonly used in various fields, including education, entertainment, conference and exhibition, and scientific research. One of the most common uses of 3D spectacles is for watching purposes in 3D theaters of movie houses, playgrounds, and museums. It is important for these institutes to get the spectacles back for re-use. Apparently, an efficient and workable management mechanism is desired for these institutes to dispense the spectacles, get the spectacles back, and disinfect the spectacles. However, the conventional 3D spectacles are not provided with individual and unique identifications and this makes the conventional 3D spectacles a problem for management of theaters.

On the other hand, RFID (Radio Frequency Identification) is commonly used in daily living of a modern society. Examples include pre-paid fare cards for public transportation, electronic toll collection (ETC) cards for highway fair, pet identification chips, anti-theft chips for library, and electronic locks for household entry control (such as MiFare chip card). For industrial and commercial applications, RFID is often used in control, tracking, and identification of cargos and products in sale channels or production channels, and examples include warehousing for product shipping and wholesales. RFID is a mature technique in the named applications, but is not yet been used in theater management.

SUMMARY OF THE INVENTION

In view of the problems discussed above, the present invention aims to provide an improved structure of three-dimensional (3D) spectacles.

An objective of the present invention is to provide an improved structure of 3D spectacles that are specifically for use in 3D auditoria or 3D theaters and are used in combination with an RFID (Radio Frequency Identification) chip and reader for the purposes of simplifying theater management and improving theater service quality.

To achieve the objective, the present invention adopts the following technical solution.

In a preferred embodiment, an improved structure of 3D spectacles is provided, comprising a spectacle frame on which an RFID chip is mounted.

The 3D spectacles are specifically for use in a 3D auditorium or 3D theater and are composed of constituent components including a frame, lenses, and temples.

The RFID chip is combined with the spectacle frame by being embedded in the frame or attached to a surface of the frame.

The arrangement of combining an RFID chip to a pair of 3D spectacles allows all 3D spectacles used in a theater to own an individual and unique identification (ID).

In a practical application of the improved structure of 3D spectacles, when an audience takes a pair of spectacles, an RFID reader detects the ID of the pair of spectacles and retrieves the status data of the specific pair of spectacles from a database through proper application software for displaying the status of the specific pair of spectacles on a display screen, such as "spectacles sanitized" or "spectacles not sanitized".

In case that the status of a pair of spectacles is shown to be "spectacles not sanitized", then the spectacles will be returned back to a dispensing station and replaced by another pair of spectacles.

In case that the status of a pair of spectacles is shown to be "spectacles sanitized", a user who is assigned with the pair of spectacles may then enter the theater and use the spectacles. Under this situation, the status of the specific pair of spectacles in the database is changed to "spectacles in use".

In the showing of a movie, once an audience wishes to use a toilet or restroom, assistance from a theater attendant for guidance is often needed. An RFID reader may be installed in a passageway to allow a management system of the theater to inform the theater attendant so that the audience may be provided with quick guidance service.

This service is also provided for audiences who drop out early.

In file-out, the 3D spectacles are returned to the theater at a theater exit and again, an RFID reader detects this and changes, through proper application software, the status of the 3D spectacles in the database to "returned" and shows a message of "thank you for returning the spectacles and welcome to visit us again".

The returned spectacles are collected for subsequent disinfection and cleaning. After the operation of disinfection and cleaning, the spectacles are conveyed through an RFID reader to have the status of the spectacles in the database changed to "spectacle sanitized" and properly stored in a warehouse for next use.

As described above, the present invention combines an RFID chip to a pair of 3D spectacles, and this is helpful in simplifying theater management and improving theater service quality.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
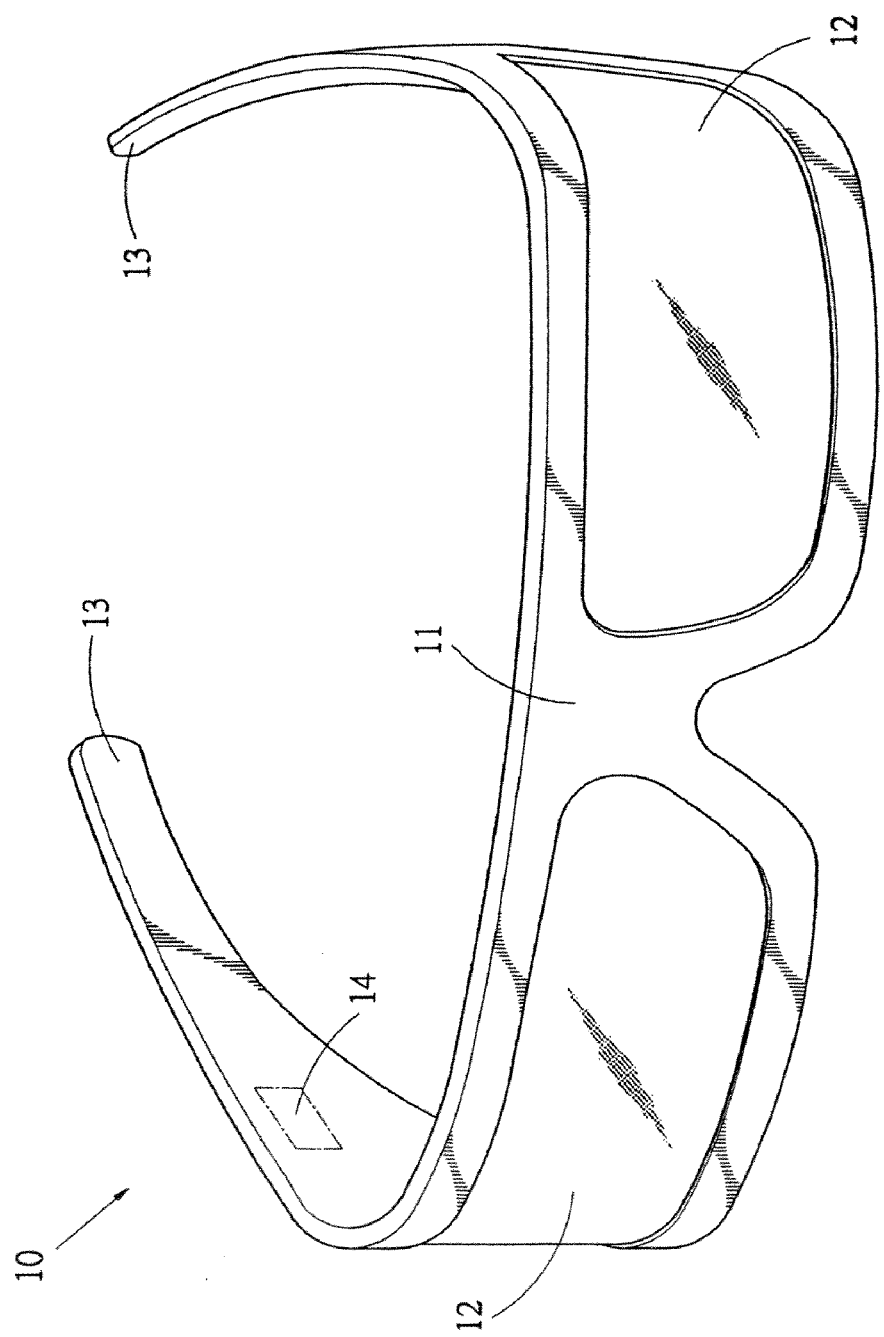
FIG. 1 is a perspective view showing an improved structure of three-dimensional (3D) spectacles according to an embodiment of the present invention.

With reference to the drawings and in particular to FIG. 1, a perspective view of an improved structure of three-dimensional (3D) spectacles according an embodiment of the present invention is shown.

As shown in FIG. 1, the improved spectacle structure of the present invention comprises an RFID (Radio Frequency Identification) chip 14 mounted to a proper site on a frame of the 3D spectacles 10.

As shown in FIG. 1, the 3D spectacles 10 are provided specifically for use in places or institutes, such as a 3D auditorium or a 3D theater. The 3D spectacles 10 is composed of constituent components including a frame 11, a pair of lenses 12, and a pair of temples 13 extending in a rearward direction from opposite sides of the frame 11.

As shown in FIG. 1, the RFID chip 14 is combined with the spectacle frame 11 by being embedded in the frame 11 or attached to a surface of the frame 11.

In the embodiment of the 3D spectacles 10 shown in FIG. 1, the RFID chip 14 is mounted to a front section of one of the temples 13 of the frame 11. It is apparent that the RFID chip 14 can be mounted to other locations on the frame 11.

The arrangement of combining the RFID chip 14 to the 3D spectacles 10 allows all 3D spectacles 10 used in a theater to own an individual and unique identification (ID), which can be read and identified by an RFID reader.

Figure 2:
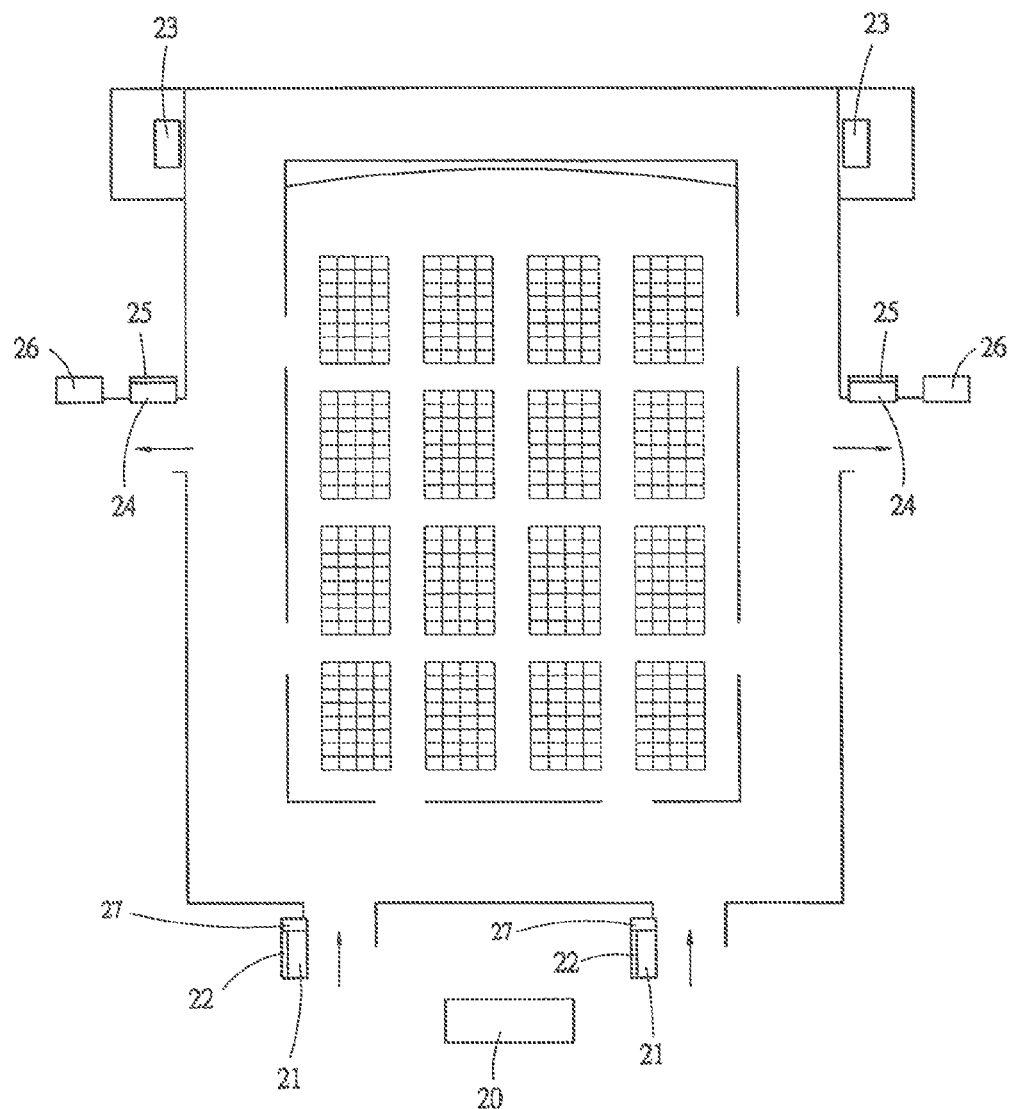
FIG. 2 is a schematic view showing an application of the 3D spectacles of the present invention in a theater.

FIG. 2 shows an application of the improved 3D spectacles of the present invention in a theater.

In FIG. 2, a plan layout of a typical theater and equipment installed in the theater for operation with the 3D spectacles according to the present invention are shown.

As shown in FIG. 2, in a practical application of the improved structure of 3D spectacles according to the present invention, when an audience who enters the theater for a show takes a pair of spectacles from a dispensing station 20 by presenting a ticket.

At an entrance of the theater, an RFID reader 21 detects the ID of the pair of spectacles and retrieves the status data of the specific pair of spectacles from a database through proper application software for displaying the status of the specific pair of spectacles on a display screen 22, such as "spectacles sanitized" or "spectacles not sanitized".

In case that the status of the spectacles is shown to be "spectacles not sanitized", then the spectacles will be returned back to the dispensing station 20 and replaced by another pair of spectacles.

In case that the status of the spectacles is shown to be "spectacles sanitized", a user who is assigned with the pair of spectacles may then enter the theater and use the spectacles. Under this situation, the status of the spectacles in the database is changed to "spectacles in use".

The theater manager may arrange a photographing device 27 at the entrance for connection with a computer system 23, so that when the RFID reader 21 detects the existence of the 3D spectacles, the photographing device 27 is activated to take a picture. This will be of help to identify the specific user of a pair of spectacles in case loss of the pair of spectacles is reported.

In the showing of a movie, once an audience wishes to use a toilet or restroom, assistance from a theater attendant for guidance is often needed. An RFID reader may be installed in a passageway to allow a management system of the theater to inform the theater attendant so that the audience may be provided with quick guidance service.

This service is also provided for audiences who drop out early.

In file-out, the 3D spectacles are returned to the theater at a theater exit and again, an RFID reader 24 detects this and changes, through proper application software, the status of the 3D spectacles in the database to "spectacles returned" and shows a message of "thank you for returning the spectacles and welcome to visit us again" on the display screen 25.

The returned spectacles are collected at a collection station 26 for subsequent disinfection and cleaning. After the operation of disinfection and cleaning, the spectacles are conveyed through an RFID reader to have the status of the spectacles in the database changed to "spectacle sanitized" and properly stored in a warehouse for next use.

Figure 3:
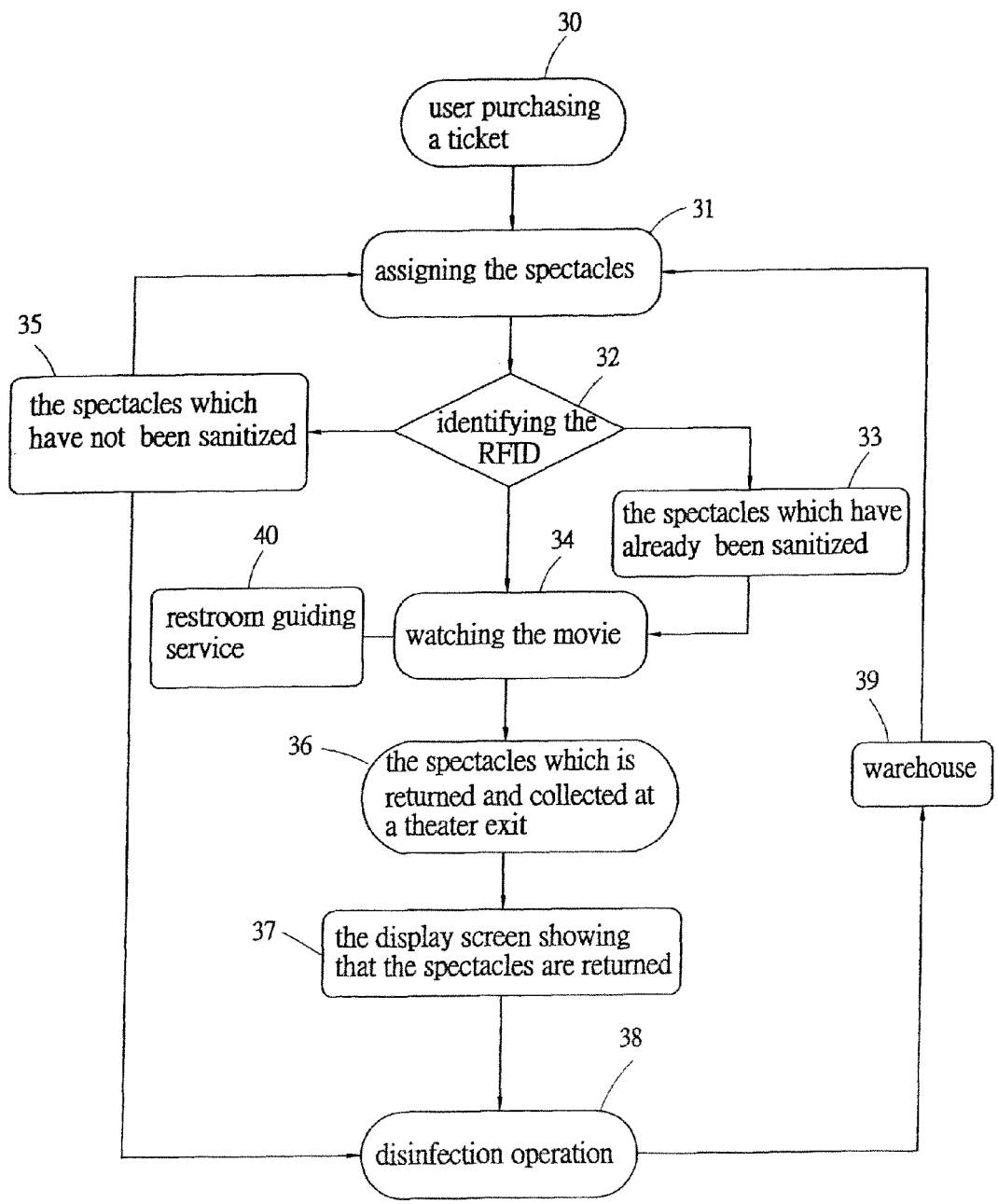
FIG. 3 shows a process of use of the 3D spectacles according to the present invention in a theater.

FIG. 3 shows a process of use of the 3D spectacles according to the present invention in a theater.

The above-discussed practical application can be more clearly understood with reference to the flow shown in FIG. 3.

As shown in FIG. 3, the process of the practical application of the present invention is as follows.

A dispensing station assigns a pair of spectacles (step 31) to each user purchasing a ticket (step 30).

Each pair of spectacles is read by a reader installed at an entrance to identify the RFID (step 32).

If it is shown in the display screen that the spectacles have already been sanitized (step 33), then the user is allowed to proceed into the theater for watching the movie (step 34).

If it is shown in the display screen that the spectacles have not been sanitized (step 35), then the spectacles are required to return to the dispensing station and another pair of spectacles is assigned (step 31) for replacement.

In watching a movie (step 34), a theater attendant may need to provide restroom guiding service (step 40) (as early dropout).

When the movie ends, each pair of spectacles is returned and collected at a theater exit (step 36) and the RFID of the spectacles is read by a reader and the display screen shows that the spectacles are returned (step 37).

Each pair of returned spectacles is collected and subjected to disinfection operation (step 38) and then conveyed to a warehouse for storage (step 39) for next use.

As described above, the present invention combines an RFID chip 14 to a pair of 3D spectacles 10, and this is helpful in simplifying theater management and improving theater service quality.

Further, the 3D spectacles 10 that are combined with an RFID chip 14 according to the present invention offers additional functions. For example, a 3D spectacles cleaning and disinfection management system is provided, which helps satisfying the need for a theater to provide effective and reliable cleaning and disinfection operation for spectacles. This ensures sanitary and safety of general consumers.

Risk of theft of 3D spectacles can be reduced, for the system discussed above helps preventing the audiences from walking off with the spectacles and also helps improving internal management of the theater.

The 3D spectacles 10 of the present invention can be used in combination with a ticketing system for counting the difference in number between audiences entering the theater hall and people who purchase thickets. This may be used to urge those purchasing thickets to enter the theater hall as soon as possible and is helpful in controlling the locations of the audiences.

The theater may use the present invention and the above discussed application thereof to provide the audiences with a sense of high technology for attracting the audiences.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A three-dimensional (3D) spectacle structure and management system therefore, comprising:
    a plurality of 3D spectacles, each pair of 3D spectacles includes: a frame, a pair of lenses mounted in the frame, and a pair of temples extending in a rearward direction from opposite sides of the frame; and
    an RFID (Radio Frequency Identification) chip, mounted to a predetermined location on one of the frame or a temple, the RFID chip providing an individual and unique identification for the pair of spectacles;

at least one first RFID reader disposed in proximity to an entrance to a movie theater, the first RFID reader configured to detect the RFID chip in each pair of 3D spectacles that pass through the movie theater entrance and configured to transmit the unique identifications associated therewith to a database to change a status thereof for indicating those corresponding pairs of 3D spectacles as being in use;

at least one first display device disposed in proximity to the entrance to the movie theater, the first display device configured to display a prior status of each pair of 3D spectacles detected by the first RFID reader for confirmation to a user of the pair of 3D spectacles;

at least one photographing device disposed in proximity to the entrance to the movie theater, the photographing device configured to photograph a user of an individual pair of 3D spectacles responsive to the first detecting the RFID chip corresponding to the individual pair of 3D spectacles;

at least one second RFID reader disposed in proximity to an exit to the movie theater, the second RFID reader configured to detect the RFID chip in each pair of 3D spectacles that pass through the movie theater exit and configured to transmit the unique identifications associated therewith to the database to change a status thereof for indicating those corresponding pairs of 3D spectacles as being in returned; and at least one second display device disposed in proximity to the exit to the movie theater, the second display device configured to display the changed status of each pair of 3D spectacles detected by the second RFID reader for confirming the returned status to a user.

* * * * *